United States Patent [19]

Yacobi

[11] Patent Number: 4,587,384
[45] Date of Patent: May 6, 1986

[54] SUB-ASSEMBLY FOR ELECTRIC MOTOR INCLUDING REVERSING SWITCH

[75] Inventor: Michael S. Yacobi, Raleigh, N.C.

[73] Assignee: Black & Decker, Inc., Newark, Del.

[21] Appl. No.: 630,247

[22] Filed: Jul. 12, 1984

[51] Int. Cl.$^4$ .................. H01H 9/00; H01H 27/00
[52] U.S. Cl. .................. 200/1 V; 200/61.19; 200/153 L; 200/153 M; 310/68 A
[58] Field of Search .......... 200/153 L, 153 LB, 1 V, 200/61.19, 153 M, 157; 310/47, 50, 68 A, 71, 242, 239

[56] References Cited

U.S. PATENT DOCUMENTS

| | | | |
|---|---|---|---|
| 3,239,629 | 3/1966 | Lesser | 200/153 M X |
| 3,691,322 | 9/1972 | Matthews | 200/1 V |
| 3,755,640 | 8/1973 | Kaman et al. | 200/1 V X |
| 3,959,756 | 5/1976 | Deming | 200/61.19 X |
| 4,523,115 | 6/1985 | Cuneo | 200/1 V X |

*Primary Examiner*—J. R. Scott

*Attorney, Agent, or Firm*—Finnegan, Henderson, Farabow, Garrett & Dunner

[57] ABSTRACT

A sub-assembly for an electric motor, including a reversing switch comprising a brush bearing plate having a circuit pattern imbedded therein with portions of the pattern exposed as pads on one surface of the plate, an opposed cover defining, together with the plate; a chamber including the exposed pads; an actuator movable within the chamber; a plurality of bridging contacts arranged for selectively coupling pairs of the exposed pads; and springs for biasing the bridging contacts into engagement with the exposed pads. As the actuator is moved within the chamber, actuator cam portions are interposed between various bridging contacts and pads so as to provide three distinct switch positions, namely, FORWARD, NEUTRAL and REVERSE. The brush bearing plate is generally U-shaped and has opposed brushes that are inwardly biased so that the entire switch sub-assembly may be fitted partially over the comutator of the motor, thereby bringing the brushes into an operative position.

23 Claims, 32 Drawing Figures

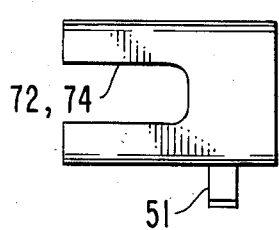
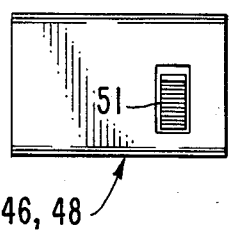
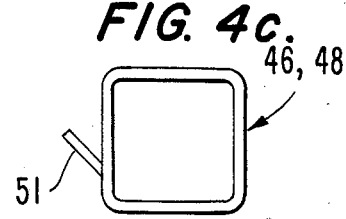
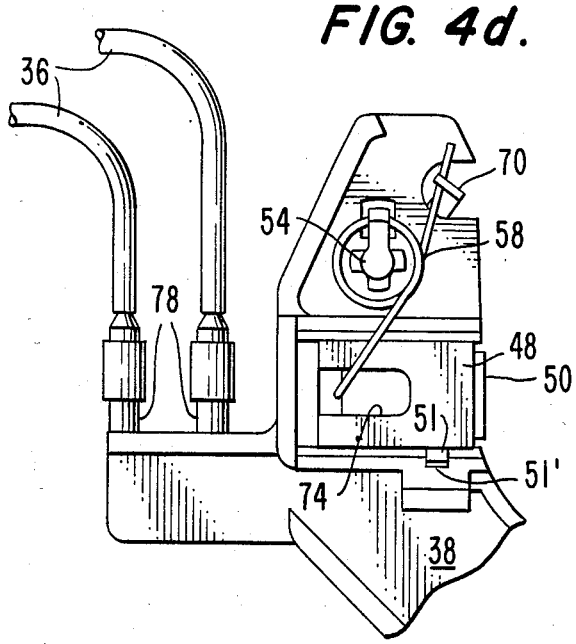
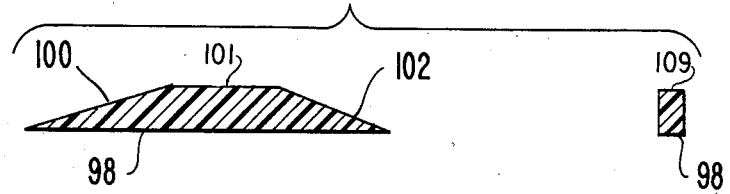
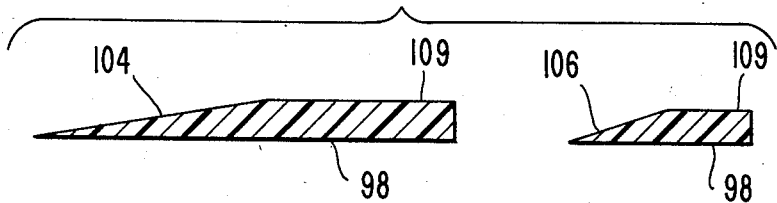
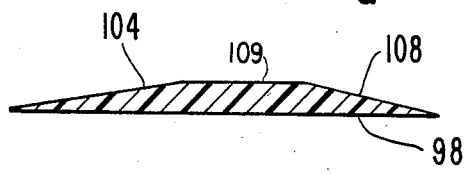

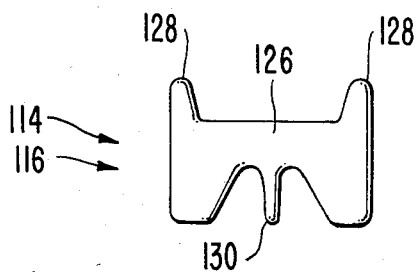
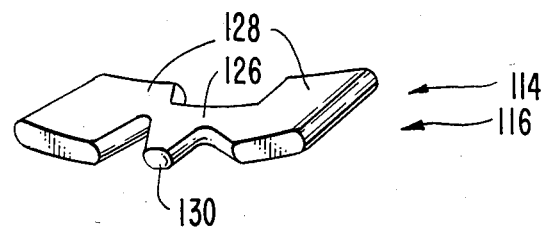
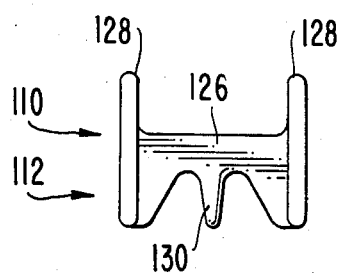
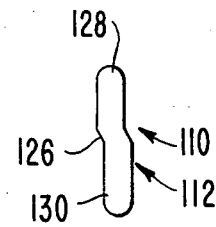
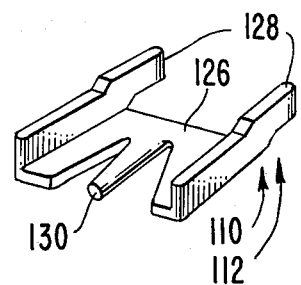
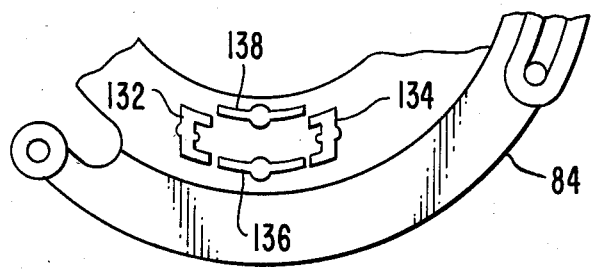
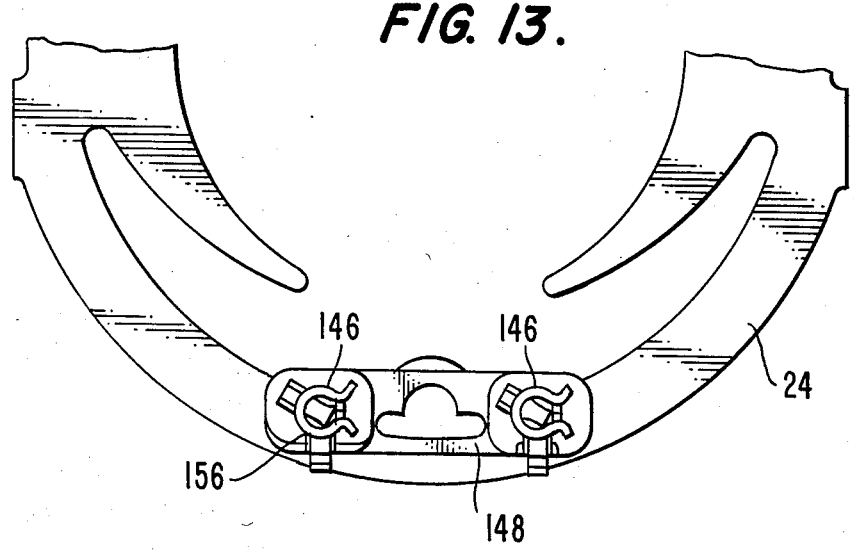

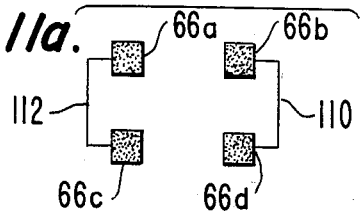
FIG. 11a.
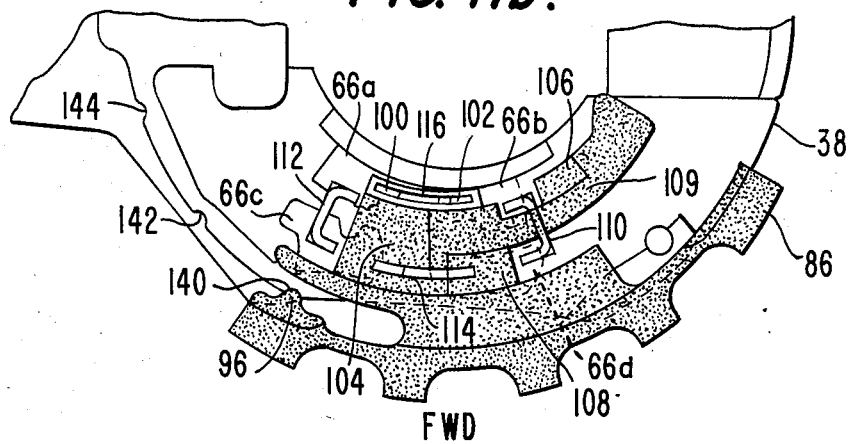
FIG. 11b.
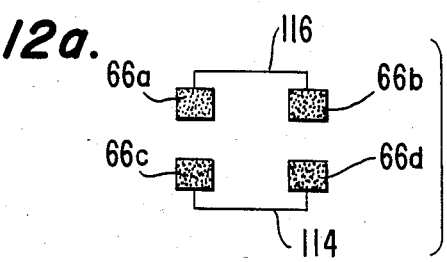
FIG. 12a.
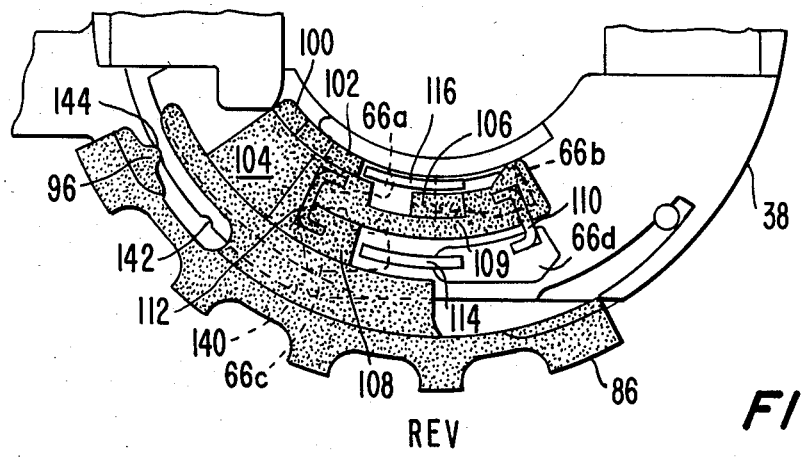
FIG. 12b.
FIG. 14.
FIG. 15.
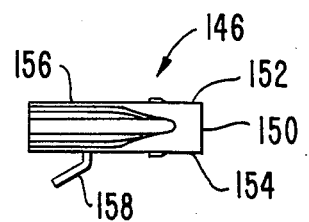

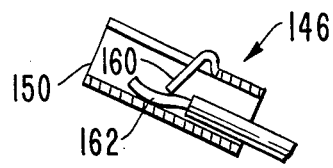
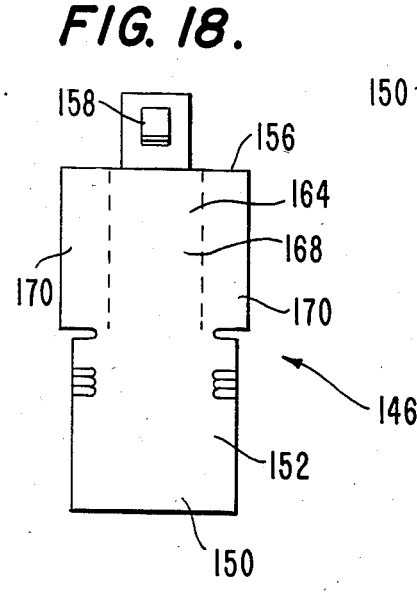
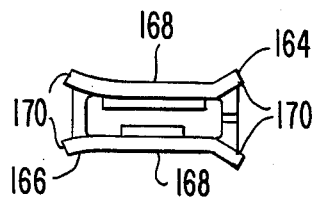
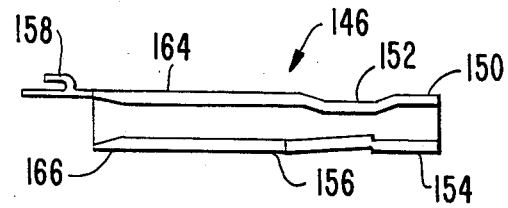
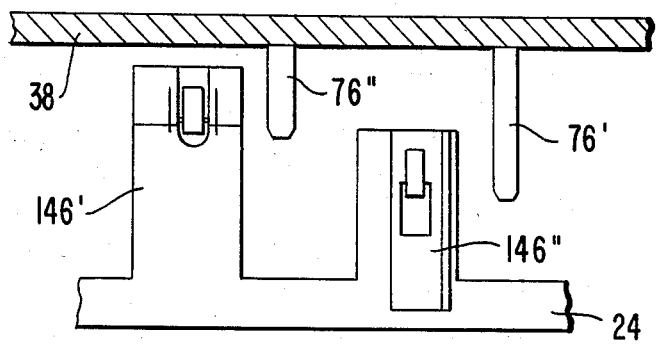
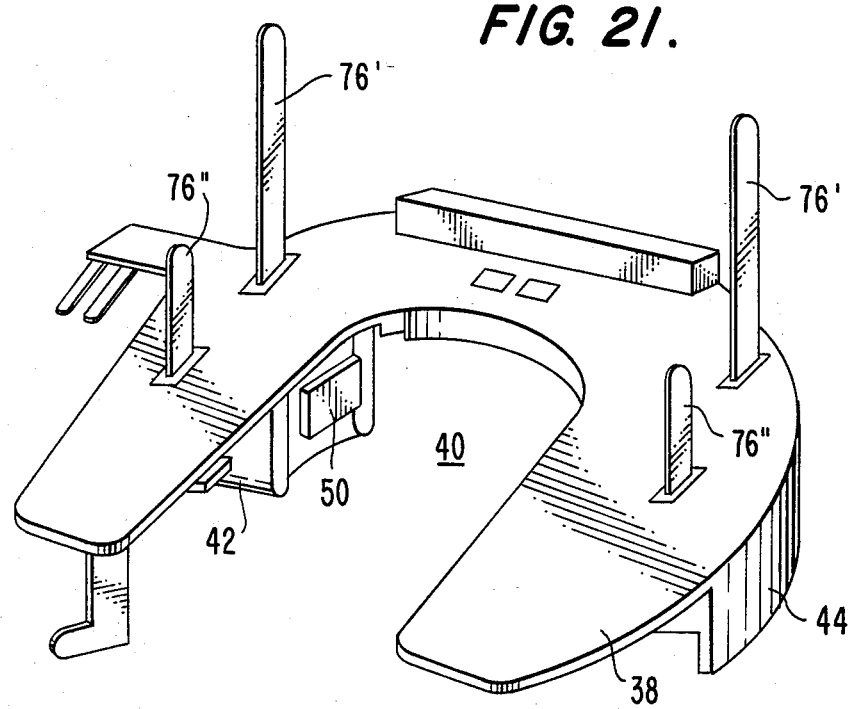

SUB-ASSEMBLY FOR ELECTRIC MOTOR INCLUDING REVERSING SWITCH

BACKGROUND OF THE INVENTION

The present invention relates to the field of electric motors and, more particularly, to a sub-assembly for conveniently maintaining brushes operatively adjacent an electric motor for providing a current reversing switch and for connection with the field assembly or stator of the motor.

Electric motors have enjoyed widespread use in a variety of devices, particularly since their small size facilitates employment in hand-held devices. Electric drills, hot air dryers, and mixers are but a few of the different types of tools which employ electric motors. An example of such a device is the portable electric drill which is the subject of U.S. Pat. No. 4,348,608 to Huber.

The motor in such a device typically comprises a fixed field assembly provided with one or more field windings which produce, upon energization, a magnetic field for effecting rotational movement of an armature positioned within the field assembly. Examples of such motors and, in particular, the field assembly therefor may be found in U.S. Pat. No. 3,979,615 to Neff, No. 4,038,573 to Hillyer et al, and No. 4,071,793 to Cox.

Such motors further include a commutator section having multiple windings or coils affixed to one end of the armature and disposed to coact with a plurality of brushes. As the armature turns, the commutator moves with it and contact is alternately made and broken with the brushes, resulting in reversing the magnetic field of the armature coils connected to the commutator bars in contact with the brushes. This produces the desired rotational movement in a well-known fashion. An example of such a motor in which the brushes are disposed on a sub-assembly surrounding the commutator can be found in U.S. Pat. No. 4,056,749 to Carlson, Jr. et al.

It is further known in the art to change the direction of current flow through either the field windings or armature windings, with respect to each other, in order to effect reversal of the direction of rotation of the armature. This is desirable, for example, in the case of an electric drill so as to engage and then disengage the drill bit from the material being worked upon. Examples of switches designed for accomplishing such reversal of current may be found in U.S. Pat. No. 3,398,250 to Bauers, No. 3,959,756 to Deming and No. 3,691,322 to Matthews.

Since motorized devices, whether designed for consumer or industrial use, are typically mass-produced, it is desirable to provide means for constructing the devices at a low cost. This raises considerations such as use of a minimum number of components, ease of assembly, and reliability in the field during actual usage. Thus, although the prior art is replete with examples of motorized tools and related sub-assemblies, there constantly exists a need for improving the construction of such devices so as to achieve reduced manufacturing costs and increased operating reliability.

For example, prior art techniques of assembling such tools involve axially sliding the brush-bearing sub-assembly over the commutator and into contact with the field assembly. Thereafter, a current reversing switch is typically provided as an element separate from said sub-assembly. However, the need for two separate elements, as well as the necessity of having to slide one part over another rather than simply fitting each into place in a single action, makes for a more difficult assembly operation. This difficult operation frequently requires that the tool, or portions thereof, be assembled by hand rather than by an automated process.

SUMMARY OF THE INVENTION

Accordingly, it is an object of the invention to provide a sub-assembly for connection with an electric motor through a radial, i.e. lateral, or axial movement.

It is another object of the present invention to provide a sub-assembly including means for maintaining a plurality of brushes in operating relationship to the commutator of the electric motor.

Another object of the invention is to provide a sub-assembly including a circuit pattern for delivering current from a power source to the field windings of an electric motor.

A further object of the invention is to provide a sub-assembly for an electric motor including a circuit pattern which can be altered to facilitate construction of a reversing switch for changing the direction of rotation of the electric motor.

It is also an object of the present invention to provide a sub-assembly for an electric motor including a manually actuatable reversing switch for changing the application of current to the motor.

Another object of the present invention is to provide contact means for connecting a sub-assembly to a field assembly in a secure and electrically safe fashion.

Additional objects and advantages of the present invention will be set forth in part in the description that follows and in part will be obvious from the description or may be learned by practice of the invention. The objects and advantages of the invention may be realized and obtained by the methods and apparatus particularly pointed out in the appended claims.

To achieve the objects and in accordance with the purpose of the invention, as embodied and as broadly described herein, a sub-assembly is provided for an electric motor having an armature assembly including a commutator and a field winding providing a magnetic field for said armature assembly, the sub-assembly comprising: a molded plate of insulating material having a central aperture for receiving the commutator; a pair of opposed frame means for supporting brush holders and brushes in operative relation to the commutator, the frame means being integrally molded in and extending from one side of the plate; a pair of spring post means for axially supporting a pair of electrically-conductive, brush-biasing springs, the spring post means being integrally molded in and extending from the one side of said plate, each of the spring post means being disposed adjacent a respective one of the frame means; a circuit pattern imbedded in the plate; a pair of electrically-conductive spring stop means extending from the one side of the plate for securing one end of a respective one of the springs and for electrically connecting the springs to the circuit pattern, each of the spring stop means being disposed adjacent a respective one of the spring post means; field winding contact means extending from the other side of the plate for electrically connecting the circuit pattern to the field windings; and power contact means extending from an edge of the plate for electrically connecting the circuit pattern to an electrical power source.

According to another aspect of the present invention, a switch is provided for controlling energization of a field winding of an electric motor by a power source, the switch comprising: a first member provided with first, second, third and fourth fixed contacts; a second member adapted for engagement with the first member so as to form a chamber therebetween, the fixed contacts being located within the chamber; an actuator at least partially enclosed within the chamber and movable therein, the actuator having a plurality of cam surfaces located within the chamber; a plurality of bridging contacts disposed within the chamber, each of the bridging contacts being arranged for engagement with a selected pair of the fixed contacts; and biasing means provided on the second member for urging the bridging contacts into engagement with the selected pairs of fixed contacts, the cam surfaces of the actuator being interposed between the bridging contacts and the fixed contacts such that movement of the actuator selectively interrupts engagement of the bridging contacts with the fixed contacts, thereby controlling the flow of power from the power source through the switch to the field winding. The actuator is movable between a first position in which the first and second fixed contacts are electrically connected, and the third and fourth contacts are electrically connected; a second position in which no more than one set of the fixed contacts are electrically connected together; and a third position in which the first and third fixed contacts are electrically connected, and the second and fourth contacts are electrically connected.

The present invention further provides an electrical connector for coupling a terminal blade with a lead wire, comprising: a base portion defining a substantially flattened tube with two major side faces; first means affixed to the base portion for receiving and retaining an end of the terminal blade, the first means being capable of receiving the blade from either an axial or lateral direction relative to the base portion; and second means affixed to the first means for receiving and retaining the lead wire, the first and second means being electrically connected together, with the second means being disposed on the first means so as to avoid restricting axial or lateral movement of the terminal blade.

Another aspect of the invention provides a switch limit apparatus for a multiple position switch having an actuator accessible through an opening in a casing in which the switch is disposed, comprising: a plurality of discrete ridges on the actuator, the ridges being manually accessible through the opening; and the opening limiting access to the ridges such that each movement of the switch between successive positions can be accomplished only by a different one of the ridges.

The accompanying drawings, which are incorporated in and constitute a part of the specification, illustrate one embodiment of the invention and, together with the description, serve to explain the principles of the invention.

BRIEF DESCRIPTION OF THE DRAWINGS

FIGS. 4a, 4b and 4c are, respectively, top, side and end views of the brush holder of FIG. 3;

FIG. 4d is a top plan view of a portion of the sub-assembly of FIG. 3 showing details of the brush holder retention means;

FIGS. 8a and 8b are detailed views of one bridging contact of the reversing switch of FIG. 6;

FIGS. 9a, 9b and 9c are views of a second bridging contact of the switch of FIG. 6;

FIG. 10 is a bottom plan view showing details of the cover plate of the reversing switch of FIG. 6;

FIGS. 11a and 11b are, respectively, a schematic and a top plan view of the reversing switch of FIG. 6 in a "FORWARD" position;

FIGS. 12a and 12b are, respectively, a schematic and a top plan view of the reversing switch of FIG. 6 in the "REVERSE" position;

FIG. 13 is a top plan view of the field assembly of an electric motor including staggered field terminals in accordance with the present invention;

FIG. 14 is a top view of a connector for the sub-assembly of FIG. 13;

FIG. 15 is a side view of the connector of FIG. 14;

FIG. 16 is a cut-away side view showing a detail of the base of the connector of FIG. 14;

FIG. 17 is a top view of a second embodiment of a connector for the sub-assembly of FIG. 13;

FIG. 18 is a side plan view of the connector of FIG. 17;

FIG. 19 is a cutaway side plan view of the connector of FIG. 17;

FIG. 20 is a side plan view showing an engagement approach between the sub-assembly and motor field assembly, in accordance with the present invention; and FIG. 21 is a perspective view of the underside of the sub-assembly of FIG. 3.

DESCRIPTION OF THE PREFERRED EMBODIMENT

Reference will now be made in detail to a presently preferred embodiment of the invention, an example of which is illustrated in the accompanying drawings.

Figure 1:
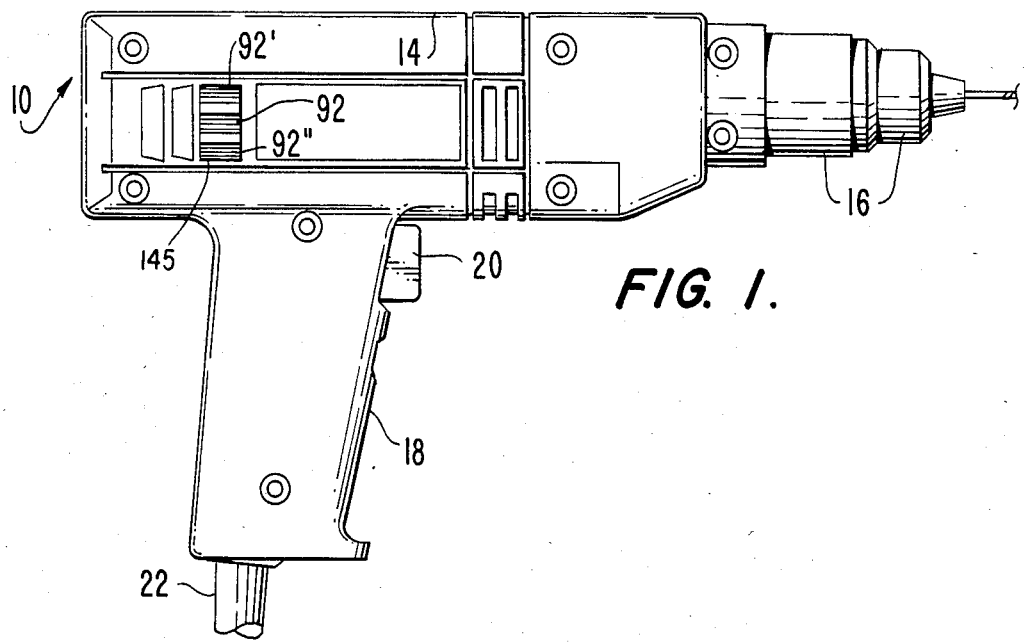
FIG. 1 is a side plan view of an electric drill illustrating a detail of the reversing switch in accordance with the present invention.
Figure 2:
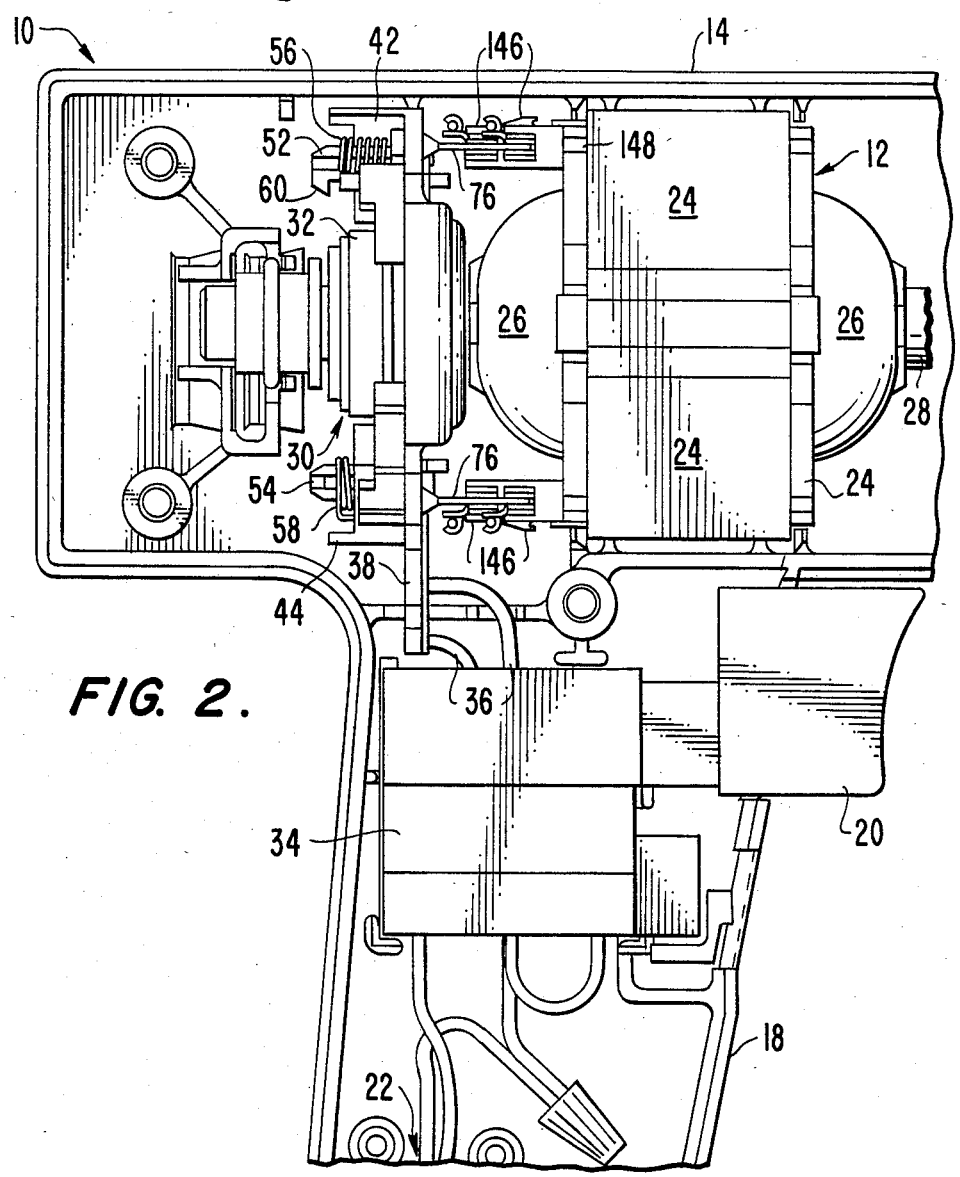
FIG. 2 is a side plan view of an electric motor of the drill of FIG. 1 showing a sub-assembly in accordance with the present invention.

FIG. 1 illustrates a side plan view of a hand-held tool, namely, an electric drill 10 which is driven by an electric motor. Details of the motor 12 are shown in FIG. 2 and will be described below. Drill 10 includes a casing 14 formed of two mating halves, with the drill chuck assembly 16 protruding from a forward end thereof. The lower portion of casing 14 is shaped into a pistol grip 18 with a speed control and on/off trigger 20 provided at a convenient position. Connection between the drill and a source of power, such as common AC household wiring (not shown), is facilitated by a power cord 22. Electric drills having the features described hereinabove are known in the art and need not be described further for purposes of understanding the present invention.

FIG. 2 illustrates a portion of the drill of FIG. 1, with one half of casing 14 removed to expose the electric motor 12 and corresponding assemblies. Motor 12 is of a well-known design comprising a field assembly 24 provided with field windings 26. Field assembly 24 is conveniently affixed to casing 14 so as to be stationary relative the casing 14. Disposed for rotational movement within assembly 24 is a armature (not shown) mounted on a shaft 28. Shaft 28 is coupled at one end to a gear assembly for driving chuck assembly 16 and the drill bit. On the opposite end of shaft 28, and mounted for rotation therewith, is an armature assembly 30 which includes a commutator 32. Commutator 32, in a known fashion, includes a plurality of switch elements, called commutator bars, arranged to coact with neighboring brushes to be described below. Electric motors of the type described are known in the art and need not be explained further for purposes of understanding the present invention.

A portion of handgrip 18 is also shown in FIG. 2, along with trigger 20 and power cable 22. Cable 22 and trigger 20 are connected to a circuit module 34 so as to deliver a controlled voltage and/or current to power supply leads 36. In the case of cable 22 being connected to common AC household wiring for example, module 34 may comprise a silicon controlled rectifier (SCR) coupled to a resistor adjusted RC network via trigger 20, thereby delivering a controlled AC voltage on wires 36. The trigger can also control on/off contacts for supplying current in a single speed application. Circuit arrangements suitable for these purposes are known in the art.

The motor sub-assembly comprising the present invention will now be explained in detail with reference to FIGS. 2 and 3.

According to the present invention, a sub-assembly for an electric motor having an armature assembly 30 including a communtator 32 and a field winding 26 providing a magnetic field includes a molded plate of insulating material having a central aperture for receiving the commutator. According to a preferred embodiment, this molded plate is designated by reference character 38 and includes a central aperture 40. During assembly, plate 38 is maneuvered such that commutator 32 fits into aperture 40, with the legs of plate 38 straddling the commutator. Accordingly, the plate is generally U-shaped in configuration. In a presently preferred embodiment, plate 38 comprises a nonconducting plastic material, such as PolyButylene Tetraphalate available from General Electric under the trademark Valox, which in injection-molded to achieve the desired configuration. Alternately, other nonconductive materials, such as nylon or phenolic, can be used in the construction of plate 38.

Also according to the invention, a pair of opposed frame means are provided for supporting brush holders and brushes in operative relation to the commutator, the frame means being integrally molded in and extending from one side of the plate. As embodied herein, the frame means 42 and 44 comprise generally rectangular walls extending perpendicular to one side of plate 38. Frame means 42 and 44 are adapted to receive, respectively, brush holders 46 and 48. Each brush holder 46, 48 carries slidably therein a brush 50 such that, when plate 38 is positioned as shown in FIG. 2, brushes 50 are aligned for engagement with the commutator bars (not shown) of commutator 32. Brush holders 46 and 48 are constructed of a material such as copper, brass, zinc or any other suitable alloy or phenolic, provided the material is suitable for housing the brushes and withstanding the heat generated by the brushes during switching.

The brushes 50 are carbon, and the brush holders may or may not be conductive.

Figure 3:
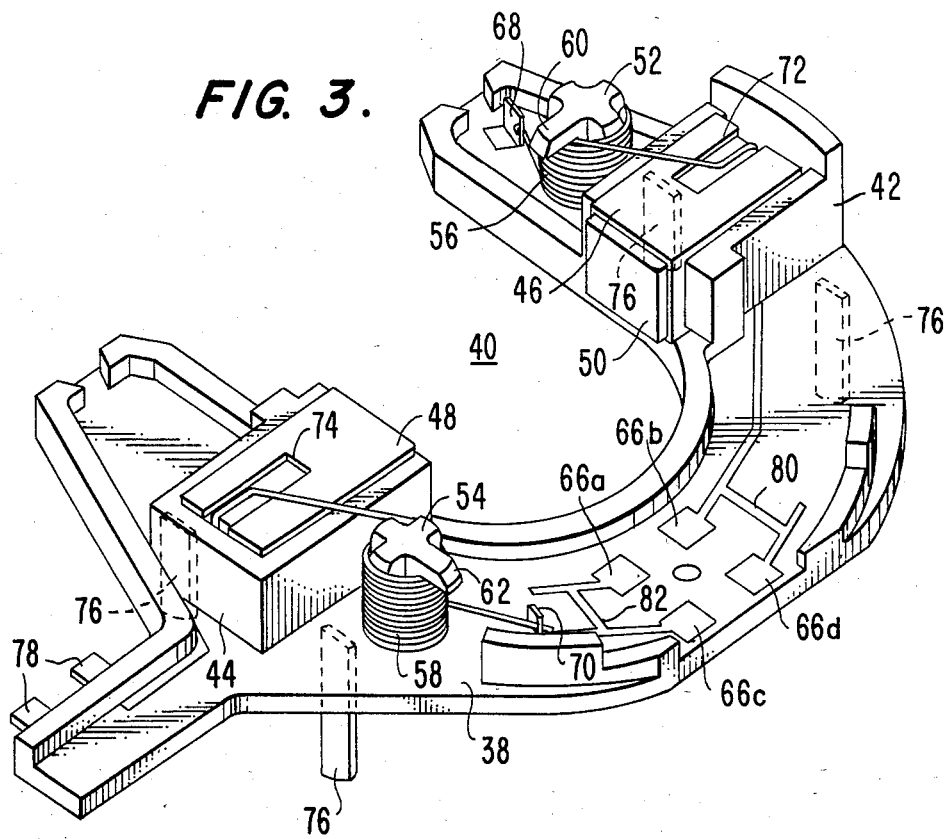
FIG. 3 is a top perspective view of the brush-bearing plate of the sub-assembly of FIG. 2.

As shown best in FIG. 3, brush holders 46 and 48 are of the same general cross-sectional dimension as the interior of frame means 42 and 44, respectively. According to a preferred embodiment, this cross-sectional dimension is generally rectangular in shape, lending a rectangular cubicle configuration to the brushes and brush holders. Although this identity in cross sections achieves a snug fit between brush holders and frame means, the brush holders are maintained within their respective frame members by means of an extending tab 51 (FIGS. 4a–4c) cut in one side wall of each brush holder which is bent outwardly so as to engage a corresponding slot 51' (FIG. 4d) formed in an inner wall of the respective frame means. As explained in detail below, the brushes 50 within each brush holder are biased toward the center of aperture 40; thus, the extending tab 51 of each brush holder is disposed so as to counteract this forwarding biasing force and prevent movement of the brush holders relative the respective frame means. Tab 51 also traps the brush holder in the frame to keep it from coming out the top.

Although the frame means, brush holders, and brushes shown in FIG. 3 are of a generally square cross section, it should be appreciated that other configurations are possible without departing from the spirit or scope of the present invention. For example, these elements could have a generally rectangular rather than square cross section, or even a circular or elliptical cross section. The specific shape will be influenced by the nature of the switch contacts provided on commutator 32 since brushes 50 are preferably designed so as to provide maximum contact with the switching contacts when adjacent thereto.

It should also be appreciated that other changes can be made in this arrangement without departing from the spirit or scope of the present invention. For example, discrete brush holders could be eliminated altogether by providing a closed top for each frame means so as to capture therein the respective brush. Alternatively, the brushes, brush holders and frame means could be assembled separately from plate 38 and then affixed thereto, such as by ultrasonic weld, glue or a snap-fit arrangement. Thus, the frame means need not be formed with creation of plate 38, but instead could be affixed integrally thereto at a later time.

According to the present invention, a pair of spring post means are provided for axially supporting a pair of electrically conductive, brush-biasing springs, the spring post means being integrally molded in and extending from the one side of the plate, with each of the spring post means being disposed adjacent a respective one of the frame means. As embodied herein, the spring post means comprise posts 52, 54 extending perpendicularly from one side of plate 38 adjacent frame means 42 and 44, respectively. Coaxially disposed on posts 52 and 54, respectively, are electrically conductive brush biasing springs 56, 58. To insure springs 56 and 58 remain securely on respective posts 52 and 54, the top portion of each post is provided with a horizontal finger 60, 62 which extends a distance greater than the outside perimeter of springs 56, 58, respectively. According to a preferred embodiment, posts 52, 54 are formed integrally with plate 38, although it is also possible to form the posts separately and later affix each securedly to plate 38.

Brush biasing springs 56, 58 preferably comprise an electrically conductive resilient wire element having a central coiled body with two extending ends. The specific configuration of springs 56, 58 will become clear from the discussion of the invention found below.

The present invention also includes a circuit pattern embedded in the plate. According to the embodiment shown in FIG. 3, a part of the circuit pattern is exposed for electricaal contact on the one side of the plate. As embodied herein, the circuit pattern is generally designated by reference character 64, and is best understood with respect to FIGS. 3 and 5. Since a portion of the circuit pattern 64 is embedded in plate 38, not all of pattern 64 is visible in FIG. 3; however, the entire circuit pattern is shown in schematic form in FIG. 5. Circuit pattern 64, which preferably is formed of copper or a similar conductive material, includes an exposed portion 66 forming discrete pads 66a, 66b, 66c and 66d. The purpose of the exposed pads 66 will be explained in further detail below with respect to the reversing switch aspects of the present invention.

According to the present invention, a pair of electrically conductive spring stop means are provided extending from the one side of the plate for securing one end of a respective one of the springs and for electrically connecting these springs to the circuit pattern, each spring stop means being disposed adjacent a respective one of the spring post means. As embodied herein, the spring stop means comprise tabs 68, 70 extending from the face of plate 38 adjacent posts 52 and 54, respectively. As shown in FIG. 3, tab 68 engages one end of spring 56 while tab 70 engages one end of spring 58. The tabs 68, 70 are preferably made of a conductive material and formed integrally with circuit pattern 64. Thus, by means of the aforementioned mechanical coupling, tabs 68, 70 and circuit pattern 64 are electrically connected with brush biasing springs 56 and 58. To insure that the ends of the respective springs do not slip off of tabs 68, 70, each tab may be provided with a flange or notched end (not shown).

Figure 5:
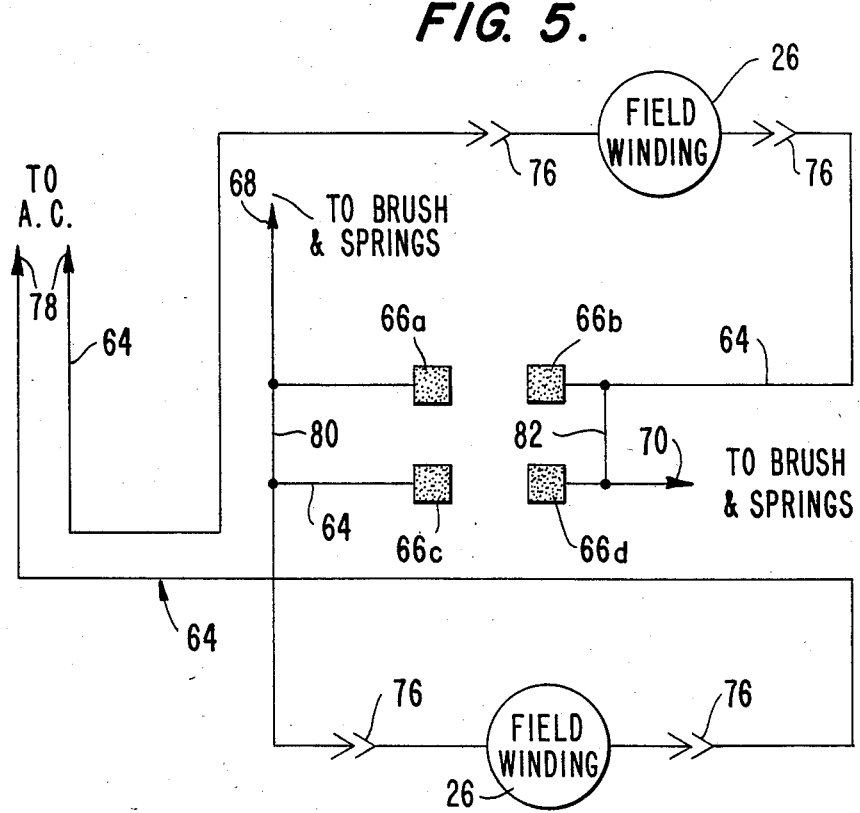
FIG. 5 is a schematic of the circuit pattern of the sub-assembly of FIG. 3.

Tabs 68 and 70 are also shown in the schematic of FIG. 5 as being electrically connected, respectively, to pads 66a, 66c and to pads 66b and 66d. The ends of springs 56 and 58 which are not engaged by tabs 68 and 70 are instead in contact with respective brushes 50. This arrangement is facilitated via slot 72, 74 formed in the exposed wall of brush holders 46, 48, respectively. Springs 56, 58 effect a biasing motion on brushes 50 so as to urge each brush towards the center of aperture 40. This biasing insures electrical contact between brushes 50 and the switching contacts of commutator 32 in a well-known fashion. Brush holders 46 and 48 remain stationary within respective frame members 42 and 44 due to the action of the outwardly directed tab fingers 51 (FIGS. 4a-4c) which engage slots 51' (FIG. 4d) the interior walls of frame means 42, 44, as described above.

Rotation of commutator 32 will eventually cause wearing down of the exposed faces of brushes 50, but consistent contact between the switching contact and the brushes is accomplished via the biasing of springs 56 and 58. Thus, the brushes will continue to wear down until the forward ends of slots 72, 74 prevent further biasing of the brushes by their respective springs. By stopping the biasing of the brushes in this manner, the slots insure that the brushes are never pushed all the way out of their respective brush holders so as to become loose within the casing of the electric drill.

The purpose of the spring post means, brush biasing springs and spring stop means is two-folds: first, to electrically connect the brushes and circuit pattern; and, second, to bias the brushes outwards to consistently coact with the commutator bars. In keeping with these functions, it is possible to modify the aforedescribed elements without departing from the spirit or scope of the invention. For example, the biasing function could be provided by springs or other resilient elements which do not play a role in electrically connecting the brushes and circuit pattern; this latter function could be accomplished via a separate, non-biasing element such as a wire connected to conductive brush holders in which respective brushes are housed. Alternatively, electrically conductive brush biasing springs could be employed albeit held in place without spring post means, e.g., by spot welding or otherwise securely affixing the ends thereof to the respective brush and circuit pattern.

The present invention further includes field winding contact means extending from the other side of the plate for electrically connecting the circuit pattern to the field winding. As embodied herein, these field winding contact means comprise terminal blades generally designated by reference character 76. Referring to FIG. 3, blades 76 are shown as extending from the underside of plate 38 at preferably a right angle thereto. As best shown in FIG. 5, blade terminals 76 are electrically connected to circuit pattern 64 for facilitating electrical connection to field windings 26. As in the case of spring tabs 68, 70, terminal blades 76 are preferably constructed of a conductive metal and formed integrally with circuit pattern 64. Further, the blades are sufficiently strong to withstand lateral or axial stresses associated with insertion of the blades into corresponding terminal connectors disposed on field assembly 24. This connecting arrangement is shown in FIG. 2 and will be described in further detail below.

The invention further includes power contact means extending from an edge of the plate for electrically connecting the circuit pattern to an electrical power source. As embodied herein, the power contact means include pins 78 which, as shown in FIG. 3, extend from a side edge of plate 38. Referring to FIGS. 2 and 5, pins 78 are electrically connected to circuit pattern 64 and, upon assembly of the hand tool, are coupled to wires 36 to receive power from module 34. This coupling can be accomplished by staples, female connectors, or other means known in the art. Pins 78 are thus made of a conductive metal and, preferably, are integrally formed with circuit pattern 64.

As will be described in further detail below, the subassembly provided on plate 38 can be connected to motor 12 by laterally bringing terminal blades 76 into connection with the field terminals of stator 24. Lateral entry is especially facilitated by the U-shaped configuration of plate 38 since the open aperture 40 permits the legs of plate 38 to straddle commutator 32. When plate 38 is positioned in this manner, brushes 50 are aligned for alternating contact with the switch contacts of commutator 32 by virtue of the forward biasing of springs 56, 58. Reference to FIG. 5 discloses the current path by which field windings 26 are energized so as to produce, in a well-known fashion, the desired rotation of shaft 28. As the commutator rotates, the commutator bars (not shown) contact brushes 50 and provide a closed circuit path via respective conducting springs 56, 58 and tabs 60, 70.

As shown in FIGS. 3 and 5, circuit pattern 64 includes a pair of circuit connecting portions 80, 82 exposed on the face of plate 38 proximate pads 66. Circuit portion 80 electrically connects pad 66a with pad 66c, while circuit portion 82 connects pads together 66b and 66d. In the embodiment described so far, circuit portions 80 and 82 are necessary components of circuit pattern 64 since each serves to complete a respective portion of the current path in order to deliver power to field windings 26. According to a further embodiment of the invention, however, circuit portions 80 and 82 can be severed, thereby terminating connection of pads 66 via circuit pattern 64 and facilitating construction of a reversing switch upon the addition of further elements described below. That is, once circuit portions 80 and 82 have been severed, a reversing switch can be created by providing various interconnections between pads 66. For example, connecting pads 66a and 66c together while connecting pads 66b and 66d together will produce rotation of the motor in a first direction; conversely, connecting pads 66a and 66b together while connecting together pads 66c and 66d will result in rotation of the motor in the opposite direction. Reversal of motor direction by changing the manner in which power is applied to the field windings or armature windings is known in the art and need not be described further. Instead, the precise manner in which the connections are made between the various pads 66 is the subject of the invention herein described.

At the outset, it is noted that severance of portions 80 and 82 can be accomplished in a variety of ways, such as by punching out a section of portions 80 and 82 together the underlying portion of plate 38. Such punching can be accomplished by a conventional tool and die arrangement. In this manner, a brush sub-assembly of the type shown in FIG. 3 having exposed pads 66 can be used as a universal sub-assembly, adaptable both to tools which require a reversing switch as well as those which do not. If it is known that a reversing switch will never be desired, their pads 66 need not be provided or at least need not be exposed on the surface of plate 38 since their function is rendered unnecessary by circuit connecting portions 80, 82. Alternately, if it is known that a reversing switch will always be required, circuit pattern 64 can be constructed without ever providing circuit connecting portions 80 and 82. It should also be appreciated that, although FIG. 3 illustrates portions 80 and 82 as being immediately adjacent pads 66 and exposed on the face of plate 38, other configurations are possible without departing from the spirit or scope of the invention. Thus, these portions could be embedded within the material comprising plate 38 or could be positioned at another point remote from pads 66, but still permitting severance thereof in case a reversing switch is sometime desired.

Details of the reversing switch according to the present invention will now be described with reference to FIGS. 6-12.

A switch for controlling energization of a field winding of an electric motor by a power source comprises, according to the invention, a first member provided with first, second, third and fourth fixed contacts. As embodied herein, this first member is plate 38 with the first through fourth fixed contacts corresponding, respectively, to pads 66a-66d. The construction and details of these elements have been described above.

According to the invention, a second member is provided adapted for engagement with the first member so as to form a chamber therebetween the fixed contacts being located within the chamber. As embodied herein, the second member comprises a switch cover 84, shown best in FIGS. 6 and 10. Cover 84 is preferably formed of a material similar to that, and in a similar fashion as that, of plate 38. In the case of a plastic material, such as PBT, comprising plate 38 and cover 84, the two elements can be connected together via ultrasonic welding, epoxy cement, heat sealing or other means. The inner surface of cover 84 is maintained a predetermined distance apart from the inner face of plate 38 so as to form a chamber therebetween. Thus, cover 84 can be affixed to plate 38 at several discrete points via a plurality of pins or posts (not shown) which extend from plate 38 perpendicular to the surface thereof.

Also according to the invention, an actuator is provided at least partially enclosed within the chamber and movable therein, the actuator having a plurality of cam surfaces located within the chamber. As embodied herein, the actuator is designated by reference character 86 and is shown in detail in FIG. 7a. Actuator 86 can conveniently be divided into two major portions: a protruding portion 88 which is not enclosed within the chamber formed by plate 38 and cover 84; and an inward portion 90 which is enclosed in the chamber. As will be described in further detail below, the chamber is generally arcuate in shape, as is inward portion 90, so that actuator 86 may be moved in a quasi-rotational fashion from one arcuate position in the chamber to another. Protruding portion 88 of actuator 86 has an outer wall defining a plurality of ridges 92 which accommodate manual manipulation of the actuator. In contrast, the inner wall 94 of protruding portion 88 is provided with a single protuberance 96 which, as described in detail below with respect to FIGS. 11b and 12b, coacts with a plurality of detents disposed on an outer edge of plate 38.

As stated above, the inward portion 90 of actuator 86 is encaptured within the chamber formed by plate 38 and cover 84. As shown best in cross-sectional views in FIGS. 7b-7d, inward portion 90 has a first side 98 which is generally planar. When the reversing switch is assembled, this planar first surface 98 faces the flat surface of plate 38 containing exposed pads 66. The planar nature of the two surfaces allows the actuator to slide easily within the chamber. Inward portion 90 has a second side including a plurality of inclined portions, namely, cam surfaces 100, 102, 104, 106, 108 and 109. The specific purpose and function of these cam surfaces will be explained in detail below, but it is important to note that each surface begins along a common edge with planar first side 98 and is inclined away therefrom.

Actuator 86 is preferably formed of reinforced nylon or some other nonconductive material. By making plate 38 and switch cover 84 of one material, and actuator 86 of a dissimilar material, it is unlikely that movement of the actuator will be inhibited as the result ultrasonic welding of the plate and switch cover. That is, the dissimilarity of the materials reduces the likelihood that spot welding of the actuator will inadvertently occur. All these elements are preferably made of self-extinguishing materials suitable for switch applications.

According to the invention, a plurality of bridging contacts are provided disposed within the chamber, each of the bridging contacts being arranged for engagement with a selected pair of the fixed contacts. The invention further includes biasing means provided on the second member for urging the bridging contacts into engagement with selected pairs of fixed contacts. As embodied herein and referring to FIG. 6, the bridging contacts are designated by reference characters 110, 112, 114 and 116, whereas the biasing means comprise springs 118, 120, 122, and 124. Both sets of elements are disposed in the chamber defined by plate 38 and switch cover 84. Bridging contacts 110 through 116 are adapted for interconnecting selected pairs of exposed pads of fixed contacts 66. Accordingly, each bridging contact is formed of a conductive metal and has a shape as shown in FIGS. 8 and 9.

Bridging contacts 114 and 116 are adapted to connect, respectively, fixed contacts 66c with 66d and contacts 66a with 66b. Accordingly, bridging contacts 114 and 116 have a shape as shown in FIG. 8. The bridging contacts each have a main body 126 having a pair of legs 128 adapted to contact simultaneously the selected pairs of fixed contacts 66. Extending from body 126 opposite to legs 128 is a pin 130 which is engaged by the central aperture of respective biasing spring 122, 124, as illustrated in the exploded view of FIG. 6. To track the generally arcuate shape of the inner chamber, bridging contacts 114 and 116 are, themselves, imparted with a slightly curved cross-sectional dimension, as shown in FIG. 8b.

Details of the construction of bridging contacts 110 and 112 are shown in FIG. 9. Each of these contacts also has a main body 126 and two extending legs 128 with an opposing pin 130. Bridging contact 110 is arranged for selectively coupling together fixed contact pads 66b and 66d. Bridging contact 112, on the other hand, is adapted for connecting contact 66a with contact 66c.

To insure accurate alignment of the bridging contacts relative to fixed contacts 66, as well as to maintain alignment between the biasing springs and the bridging contacts, the inner surface of switch cover 84 is provided with a plurality of slots 132, 134, 136 and 138, as shown in FIG. 10. That is, the surface of switch cover 84 which faces into the chamber containing exposed fixed contact 66 has indentations for purposes of positioning the bridging contacts in the aforementioned manner with respect to fixed contacts 66. Thus, bridging contact 110 and spring 118 fit into indentation 132; bridging contact 112 and spring 120 fit into indentation 134; bridging contact 114 and spring 122 fit into indentation 136; and bridging contact 116 and spring 124 fit into indentation 138. In assembling the switch, the biasing spring is first placed into the enlargened central aperture of each indentation, whereafter the respective bridging contact is placed thereover. Each biasing spring thus serves to urge the respective bridging contact out of the corresponding indentation in switch cover 84. To insure that the bridging contacts move only in a direction normal to the surface of switch cover 84 and plate 38, the indentations each have a cross-sectional dimension and configuration corresponding to the respective bridging contact, as evidenced by a comparison FIGS. 8 and 9 with FIG. 10.

Figure 6:
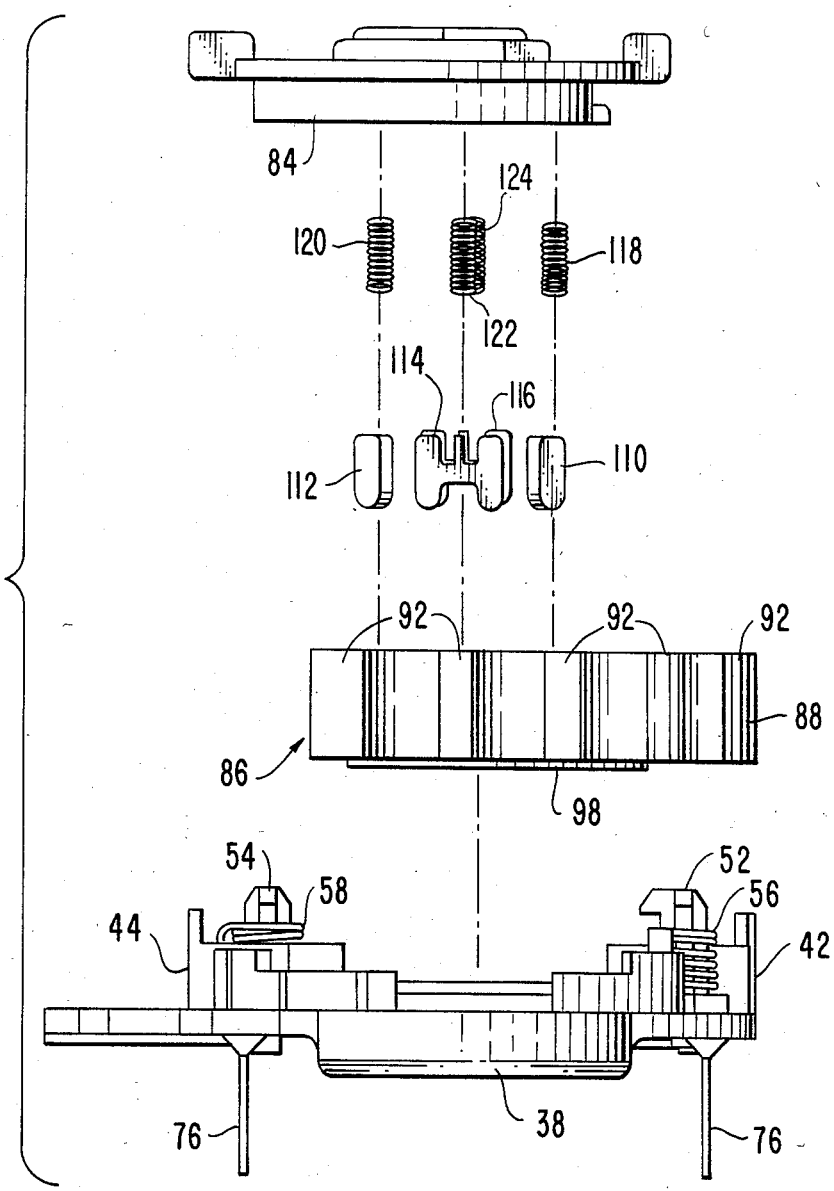
FIG. 6 is an exploded side plan view showing the elements of a reversing switch in accordance with the present invention.
Figure 7A:
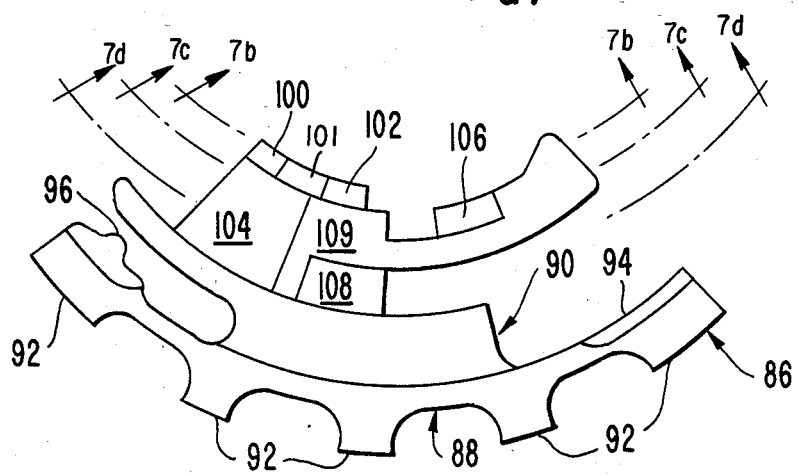
FIGS. 7 and 7b-d are, respectively, a top plan view and cross-sectional views of the actuator of the reversing switch of FIG. 6.

Operation of the reversing switch will now be described with reference first to the exploded view shown in FIG. 6. As apparent from the drawing, actuator 86 is interposed between bridging contacts 110-116 and fixed contacts 66 of plate 38. The biasing effect of springs 118-124 urges the bridging contacts against the cam surfaces 100-109 of actuator 86. The geometry of these cam surfaces of inward portion 90 of actuator 86 are such that different pairs of the bridging contacts are selectively allowed to contact certain pairs of fixed contacts 66 as the actuator is moved from one position to another within the chamber defined by plate 38 and switch cover 84.

Referring first to FIGS. 11a and 11b, the reversing switch is shown therein with actuator 86 moved to a first position to cause the flow of current through the switch to the field windings to move the motor in a first direction of rotation, designated the "FORWARD" direction. FIG. 11a shows schematically the coupling arrangement which occurs between bridging contacts 110 and 112 and fixed contacts 66. It should be appreciated that the arrangement illustrated in FIG. 11a is identical to that shown in FIG. 5, with the difference being that connecting portions 80 and 82 are herein replaced by bridging contacts 112 and 110, respectively. Thus, the flow of current through the circuit pattern to the field windings is identical in both instances of FIGS. 5 and 11a.

The mechanical aspects of the reversing switch in the "FORWARD" position will now be described with reference to FIG. 11b. As shown in that figure, selected portions of inward portion 90 of actuator 86 are interposed between bridging contacts 114, 116 and fixed contacts 66. Specifically, bridging contact 114 is lifted out of connection with fixed contact 66 by virtue of cam surfaces 104 and 108, while bridging contact 116 is lifted out of contact with fixed contacts 66 by virtue of the interpositioning of cam surfaces 100 and 102. On the other hand, bridging contact 112 is urged by the action of corresponding spring 120 (not shown) into engagement with fixed contacts 66a and 66c. Bridging contact 110 is likewise urged by its spring 118 so as to connect fixed contact 66b with contact 66d. Although a portion of actuator 86 is interposed between bridging contact 110 and fixed contacts 66b, 66d, the legs 128 of bridging contact 110 straddle the interposing portion so as to still effect contact with the selected pair of fixed contacts 66b, 66d.

To effect reversal of the direction of rotation of the electric motor, the reversing switch is manipulated into the position shown in FIG. 12b and concomitant electrical schematic of FIG. 12a. Discussing first the schematic, in the "REVERSE" position fixed contacts 66a and 66b are coupled together by bridging contact 116, while fixed contacts 66c and 66d are coupled together via bridging contact 114. This is the opposite arrangement from that illustrated in FIG. 5 and, in a known fashion, accomplishes reversal of the direction of rotation of the motor having field windings 26.

FIG. 12b illustrates the mechanical interrelationship between actuator 86 and the bridging contacts in this "REVERSE" position. First, no part of inward portion 90 of actuator 86 is interposed between bridging contacts 114, 116 and fixed contact 66, thus permitting the electrical arrangement shown in FIG. 12a. As to bridging contact 110, at least one leg thereof is lifted off of fixed contact 66a by the interposition of cam surface 106 of actuator 86; thus, bridging contact 110 cannot provide a path for flow of current. With respect to bridging contact 112, it is entirely separated from fixed contacts 66 by the interposition of cam surfaces 108 and 109' of actuator 86; thus, bridging contact 112 also cannot provide a path for current flow.

From the foregoing, it may be appreciated that a reversing switch according to the present invention includes an actuator movable between at least two positions in which cam surfaces of the actuator are interposed between bridging contacts and corresponding pairs of fixed contacts. To insure accurate placement of the actuator in these various positions, a series of detents 140, 142 and 144 are provided along an edge of plate 38. Protuberance 96 on the inner wall 94 of the protruding portion 88 of actuator 86 interacts with a corresponding one of these detents 140, 142, 144 so to provide a "locked" feel as the actuator is moved from one position to another. Thus, in the "FORWARD" switch position, protuberance 96 is engaged by detent 140 whereas in the "REVERSE" switch position engagement is had with detent 144. This detent arrangement gives the drill operator a positive tactile indication that the switch has been fully moved to a new position.

The center detent 142 corresponds to a "NEUTRAL" switch position (not shown). The importance of this position is understood upon consideration of the effect of reversal of the direction of rotation of the motor from forward to reverse. That is, it is desireable to provide a momentary pause between these two positions so as not to prematurely apply a reversing current and risk damage to the motor. Thus, a "NEUTRAL" switch position is provided in which the cam surfaces of actuator 86 interpose between the bridging contacts and fixed contacts 66 so as to disrupt all application of current to the field windings. The desired delay between the two powered switch positions is therefore accomplished by several means: first, the time necessarily required in moving the actuator from one extreme position to the other; second, the time required to overcome the engagement of protuberance 96 and one of detents 140, 142, 144; and, third, the time required to make two distinct movements of the actuator, which is due to a particular relationship between the notches 92 of the actuator and casing 14. The first two factors are apparent from the discussion above, whereas the third factor is now discussed in detail.

With the sub-assembly including the reversing switch assembled in place within the electric drill, ridges 92 of actuator 86 are made accessible through an opening 145 in the side of casing 14. Thus, by exerting force in an upward or downward direction upon a selected one of ridges 92, the drill operator can effect a change in the setting of the reversing switch and, hence, in the direction of rotation of the drill. According to the present invention, the dimension of opening 145 and the spacing of ridges 92 are selected such that only one ridge is accessible for manual movement at a given time. For example, presume the drill as illustrated in FIG. 1 has the reversing switch set to the "FORWARD" position. Although parts of ridges 92' and 92" are visible through opening 145, only ridge 92 is in fact accessible for manipulation. By exerting a downward force upon ridge 92, bringing it into alignment with the bottom edge of opening 145, the operator manages to cause the reversing switch to move to its "NEUTRAL" position. Due to the size of opening 145, however, further pressure upon ridge 92 will effect no additional movement of the actuator; instead, the above-described movement has caused bridge 92' to be exposed in the center of opening 145 and, thus, accessible for manipulation. The operator, in order to accomplish switching to the "REVERSE" position, must now exert a downward pressure on exposed ridge 92' until this ridge is positioned at the lower edge of opening 145. In this latter position, the reversing switch has been successfully moved to its "REVERSE" position.

The spatial relationship between opening 145 and ridges 92 can best be expressed in terms of the longitudinal dimension of opening 145 being equal to approximately two times the distance between each of the ridges 92, presuming the ridges are uniformly spaced. Thus, for a given switch position, such as NEUTRAL, ridge 92 will be substantially in the middle of opening 145. To move to another switch position from NEUTRAL, e.g. FORWARD or REVERSE, ridge 92 must be moved to either end of opening 145 to the positions previously occupied by one of ridges 92' and 92". Since ridge 92 is thus always visible within opening 145, although not always accessible for manipulation, ridge 92 can be used to indicate the various positions of the reversing switch. This can be accomplished, for example, by placing a color stripe on ridge 92 with corresponding stripes and legends being placed on casing 14 adjacent opening 145.

According to a preferred embodiment, ridges 92, 92' and 92" are spaced equidistant apart, and are parallel to each other while perpendicular to the path of movement of the switch. Design alternatives are possible, however, such as oblique displacement of the ridges, without departing from the present invention.

It will therefore be appreciated that the ridges are positioned so that only one switch movement may be accomplished at a single time: "REVERSE" to "NEUTRAL" or "NEUTRAL" to "FORWARD". The need for the operator to lift his finger(s) from one ridge to another thus provides the desired delay in the movement from "FORWARD" to "REVERSE" positions.

Up to this point, reference has only been made in general terms to connection of the sub-assembly, namely brush bearing plate 38 of FIG. 3 or the completed reversing switch of FIGS. 6–12, with the field assembly of the motor. A description will now be given of the specific details regarding this connection and, in particular, the field terminals of the field assembly.

The field assembly 24, in which the field windings 26 are provided, is illustrated in FIGS. 2 and 13. As best shown in FIG. 2, the field windings according to a presently preferred embodiment of the invention, include four wires to which power is applied by the circuit pattern of the subject sub-assembly. Thus, it is necessary to provide electrical connection between these four wires and the four terminal blades 76 of the sub-assembly. This is done by grouping terminal blades 76 into two pairs and providing corresponding electrical connectors 146 affixed to field assembly 24. A pair of such connectors are shown in FIG. 13, whereas both pairs of connectors with the terminal blades engaged therewith are shown in FIG. 2.

Referring to FIG. 13, field assembly 24 is provided with a non-conductive mounting board 148 which is adapted to carry connectors 146. This permits connectors 146 to be mechanically affixed to field assembly 24 with a high degree of rigidity and without effecting any unwanted electrical interconnection. It should be appreciated, however, that such mechanical affixation could be accomplished with means other than mounting board 148 without departing from the spirit or scope of the invention.

Referring to FIGS. 13–16, an electrical connector for coupling a terminal blade with a wire according to the present invention includes a base portion defining a substantially flattened tube with two major side faces. As embodied herein, the base portion of electrical connector 146 is designated by reference character 150 and has major side faces 152, 154. Base portion 150 is secured to mounting board 148 and, hence, to field assembly 24 by any suitable means such as being imbedded in board 148, or being mechanically affixed thereto by other suitable means. Variations in this manner of connection are considered to be obvious to one skilled in the art and do not constitute a departure from the spirit or scope of the present invention.

An electrical connector according to the invention also includes first means affixed to the base portion for receiving and retaining an end of the terminal blade, the first means being capable of receiving the blade from either an axial or lateral direction relative to said base portion. As embodied herein, the first means are designated by reference character 156 and comprise a resilient metal or alloy formed with an omega-shaped cross section. As shown best in FIGS. 13 and 14, this configuration permits insertion of terminal blades 76 (not shown) from a lateral direction, i.e. from the right of the drawings, or from an axial direction, i.e. into the plane of the drawings. The resilient nature of the omega-shaped portion insures secure mechanical and electrical coupling between connector 146 and terminal blade 76 regardless of the direction of entry.

According to the invention, second means are provided affixed to the first means, for receiving and retaining a wire, the first and second means being electrically connected together with the second means being disposed on the first means so as to avoid restricting axial or lateral movement of the terminal blade. As embodied herein, the second means comprise a deformable tang 158, as best illustrated in FIG. 15. Tang 158 extends from one side of omega-shaped portion 156 and, after placement of a wire between tang 158 and portion 156, the gang can be bent over towards portion 156 so as to securely encapture the wire. The tang may then be fused or welded to portion 156 to ensure electrical and mechanical connection. As shown in FIG. 2, the captured wires comprises the various ends of field winding 26. To ensure these wires remain in place, anchoring means may be provided on board 148 in the form of a notch or stop against which the wire is fitted.

Connector 146 is preferably made of a single piece of resilient metal which is formed from a single blank bent into the desired configuration. In this manner, the entire connector is electrically conductive so that the desired electrical coupling between the wire and terminal blade is readily achieved, while the mounting arrangement on board 148 otherwise insulates the structure from field assembly 24.

In the event terminal blade 76 is replaced by a piece of wire, base portion 150 of connector 146 can be provided with an inner tab 160 of the type shown in FIG. 16. By directing the wire 162 axially into connector 146 and between tab 160 and the wall of base portion 150, wire 162 can be engaged such that any attempt to withdraw the wire is countered by the effect of tab 160. This arrangement, sometimes referred to as a "Chinese finger", is well known in the art of electrical connectors.

A further embodiment of a connector according to the present invention is shown in FIGS. 17-19 in which like reference characters are used to designate like elements with respect to FIGS. 13-16. According to this embodiment, first means 156 comprises a pair of resilient opposed walls 164, 166 extending from major faces 152, 154, respectively, of base portion 150. Each one of walls 164, 166 comprises a gripping portion 168 extending from and planar with a respective one of major faces 152, 154, and a pair of outwardly directed lips 170 disposed along each lateral edge of gripping portion 168. Corresponding lips 170 of each of walls 164, 166 coact so as to guide a terminal blade therebetween in the event of lateral insertion of the blade, whereafter further lateral movement of the blade causes it to be firmly encaptured by gripping portion 168. Alternatively, the blade maybe introduced axially between gripping portions 168 directly. The inner edges of lips 170 may be bevelled to provide smooth lateral insertion of the blade. Similarly, the outwardly-directed edges of walls 164, 166 may be bevelled to provide smooth axial insertion of the blade.

In this second embodiment of connector 146 it is also noted that second means 158 comprises a deformable tang extending from an outer edge of wall 164. With this construction, a wire from field winding 26 positioned sideways across tang 158 can be held in place without restricting axial or lateral movement of the terminal blade into the connector. The wire is kept out of the way by anchoring means provided on board 148.

A further aspect of the present invention may be learned by reference to FIGS. 20 and 21 which illustrate a connector assembly for an electric motor for electrically coupling a field winding disposed about a support with armature brushes disposed on a circuit board.

According to this aspect of the invention, a pair of terminal blades are provided electrically coupled to the brushes and mounted on the circuit board, the blades extending parallel and planar to each other with a first one of the blades being longer than a second one of the blades. As embodied herein, the terminal blades are designated by reference characters 76' and 76", of a construction described hereinabove. These blades, which extend generally parallel and planar with respect to each other and perpendicular to the bottom of plate 38, are electrically connected to brushes 50 via circuit pattern 64 (See, FIG. 5). As shown in FIGS. 20 and 21, terminal blades 76' are longer than blades 76".

Also according to the invention, a pair of blade receiving means are provided disposed on the field winding support and electrically coupled to the field winding, the blade receiving means being positioned for receiving a respective one of the terminal blades, and extending from the field terminal support with a first one of the blade receiving means extending farther than a second one of the blade receiving means such that the first and second blade receiving means are keyed to receive, respectively, the second and first terminal blades. As embodied herein, the first and second blade receiving means are identified, respectively, by reference characters 146' and 146" in FIG. 20. These blade receiving means are each comprised of a connector 146 of the type described above with respect to FIGS. 13-19, and each is fitted into a corresponding housing in board 148. It should be appreciated that connector 146' extends a farther distance away from field assembly 24 than does connector 146". This relationship is also illustrated in FIG. 2, in which both connectors are simply designated by reference character 146.

As stated previously, it is advantageous to assemble the motor and subject sub-assembly by laterally introducing the commutator into the aperture of plate 38, rather than by axially sliding the plate along the motor shaft until the commutator is reached. The connector arrangement of FIG. 20 is perfectly adapted for accommodating electrical connection between the subject sub-assembly and the field windings as this operation is performed. Namely, as plate 38 is moved towards the left (referring to FIG. 20) so as to fit over the commutator, terminal blade 76" is encaptured by connector 146' while terminal blade 76' is encaptured by connector 146". Alternately, this connection may be accomplished by axially plugging blades 76' and 76" into connectors 146" and 146', respectively. The staggered arrangement of these terminals and connectors prevents inadvertent connection between lead terminal 76" and connector 146" during assembly. This certainty of correct engagement, coupled with the ease of providing automatic lateral insertion, insures that assembly of the drill can truly be an automated process.

It will be apparent to those skilled in the art that modifications and variations can be made in the electric motor sub-assembly and connectors of this invention. For example, the reversing switch herein described could be modified to provide merely a two-position operation, i.e. an ON-OFF switch. The invention in its broader aspects is, therefore, not limited to the specific details, representative methods and apparatus, and illustrative examples shown and described herein. Thus, it is intended that all matter contained in the foregoing description or shown in the accompanying drawings shall be interpreted as illustrative and not in a limiting sense.

What I claim is:

1. A switch for controlling energization of an electric device by a power source, comprising:
    a first member provided with first, second, third and fourth fixed contacts;
    a second member coupled to said first member so as to form a chamber therebetween, said fixed contacts being located within said chamber;
    an actuator at least partially enclosed within said chamber and movable therein, said actuator having a plurality of cam surfaces located within said chamber;
    a plurality of bridging contacts provided in said second member and disposed within said chamber, each of said bridging contacts being arranged for engagement with selected ones of said fixed contacts; and
    biasing means for urging said bridging contacts into engagement with said selected ones of fixed contacts,
    said cam surfaces of said actuator being interposed between said bridging contacts and said fixed contacts such that movement of said actuator selectively interrupts engagement of said briding contacts with said fixed contacts, thereby controlling the flow of power through the switch,
    said actuator being movable to a first position in which said first and second fixed contacts are electrically connected together; and said third and fourth contacts are electrically connected together; a second position in which no more that one pair of said fixed contacts are electrically connected together, and a third position in which said first and third fixed contacts are electrically connected together, and said second and fourth contacts are electrically connected together.

2. A switch as recited in claim 1 having four bridging contacts, each of said bridging contacts being positioned so as to engage simultaneously a different pair of said fixed contacts when urged thereagainst by said biasing means.

3. A switch as recited in claim 2 wherein said actuator is movable between said first, second and third positions, said actuator electrically decoupling two of said bridging contacts from said fixed contacts when in said first position, electrically decoupling the other two bridging contacts from said fixed contacts when in said third position, and electrically decoupling said bridging contacts from said fixed contacts when in said second position.

4. A switch as recited in claim 3 wherein said second position is intermediate said first and third positions.

5. A switch for controlling energization of an electric device by a power source, comprising:
    a first member provided with first, second, third and fourth fixed contacts;
    a second member coupled to said first member so as to form a chamber therebetween, said fixed contacts being located within said chamber;
    an actuator at least partially enclosed within said chamber and movable therein, said actuator having a plurality of cam surfaces located within said chamber;
    a plurality of bridging contacts provided in said second member and disposed within said chamber, each of said bridging contacts being arranged for engagement with selected ones of said fixed contacts; and
    biasing means for urging said bridging contacts into engagement with said selected ones of fixed contacts,
    said cam surfaces of said actuator being interposed between said bridging contacts and said fixed contacts such that movement of said actuator selectively interrupts engagement of said bridging contacts with said fixed contacts, thereby controlling the flow of power through the switch,
    said actuator being movable to a first position in which said first and second fixed contacts are electrically connected together; and said third and fourth contacts are electrically connected together; a second position in which no more that one pair of said fixed contacts are electrically connected together, and a third position in which said first and third fixed contacts are electrically connected together, and said second and fourth contacts are electrically connected together,
    each of said bridging contacts has a pair of legs extending from a unitary body, each leg being adapted to contact a corresponding fixed contact of said selected pair of fixed contacts, said actuator effecting disengagement of said bridging contact from said fixed contact by being interposed between at least one leg of said bridging contact and a corresponding fixed contact.

6. A switch as recited in claim 5 wherein said bridging contacts are individually disposed in corresponding indentations formed in said second member.

7. A switch as recited in claim 1 wherein said biasing means comprises a plurality of springs.

8. A switch as recited in claim 1 wherein said biasing means are provided in said second member.

9. A switch as recited in claim 8 wherein said biasing means comprises a plurality of springs individually disposed in indentations formed in said second member.

10. A switch as recited in claim 6 wherein said biasing means comprises a plurality of springs individually disposed in said indentations in said second member.

11. A switch for controlling energization of an electric device by a power source, comprising:
  a first member provided with first, second, third and fourth fixed contacts;
  a second member coupled to said first member so as to form a chamber therebetween, said fixed contacts being located within said chamber;
  an actuator at least partially enclosed within said chamber and movable therein, said actuator having a plurality of cam surfaces located within said chamber;
  a plurality of bridging contacts provided in said second member and disposed within said chamber, each of said bridging contacts being arranged for engagement with selected ones of said fixed contacts; and
  biasing means for urging said bridging contacts into engagement with said selected ones of fixed contacts,
  said cam surfaces of said actuator being interposed between said bridging contacts and said fixed contacts such that movement of said actuator selectively interrupts engagement of said bridging contacts with said fixed contacts, thereby controlling the flow of power through the switch,
  said actuator being movable to a first position in which said first and second fixed contacts are electrically connected together; and said third and fourth contacts are electrically connected together; a second position in which no more that one pair of said fixed contacts are electrically connected together, and a third position in which said first and third fixed contacts are electrically connected together, and said second and fourth contacts are electrically connected together, and
  said second member and actuator being generally arcuate in shape, with said first member including an arcuate portion concentrically movable within said chamber.

12. A switch as recited in claim 11 further comprising detent means for positively engaging said actuator in one of said positions.

13. A switch as recited in claim 11 wherein a portion of said actuator protrudes from said chamber to facilitate manual grasping and movement of said actuator between said first, second and third positions.

14. A switch as recited in claim 13 wherein said protruding portion of said actuator has an inner wall facing towards said first and second members, said inner wall having detent means for positively engaging said actuator in one of said positions.

15. A switch as recited in claim 12 wherein said detent means comprises a protuberance on said inner wall cooperating with a plurality of notches in said accurate portion of said first member.

16. A switch as recited in claim 13 wherein said protruding portion of said actuator has an outer wall facing away from said first and second members, said outer wall being provided with a plurality of ridges to aid said manual movement.

17. A switch as recited in claim 1 wherein said first, second and third positions comprise, respectively, a first position for applying power to the device with a current flow in a first direction, a second position for disrupting the delivery of power to the device, and a third position for applying power to the device with a current flow in a second direction opposite to said first direction, said second position being intermediate said first and third positions.

18. A switch for controlling energization of an electric device by a power source, comprising:
  a first member provided with first, second, third and fourth fixed contacts;
  a second member coupled to said first member so as to form a chamber therebetween, said fixed contacts being located within said chamber;
  an actuator at least partially enclosed within said chamber and movable therein, said actuator having a plurality of cam surfaces located within said chamber;
  a plurality of bridging contacts provided in said second member and disposed within said chamber, each of said bridging contacts being arranged for engagement with selected ones of said fixed contacts; and
  biasing means for urging said bridging contacts into engagement with said selected ones of fixed contacts,
  said cam surfaces of said actuator being interposed between said bridging contacts and said fixed contacts such that movement of said actuator selectively interrupts engagement of said bridging contacts with said fixed contacts, thereby controlling the flow of power through the switch,
  said actuator being movable to a first position in which said first and second fixed contacts are electrically connected together; and said third and fourth contacts are electrically connected together; a second position in which no more that one pair of said fixed contacts are electrically connected together, and a third position in which said first and third fixed contacts are electrically connected together, and said second and fourth contacts are electrically connected together, and
  said fixed contacts being exposed on an inner surface of said first member, said inner surface and fixed contacts being generally planar and facing a corresponding planar surface on one side of said actuator, and said actuator having a second side facing said bridging contacts, and said second side having a plurality of cam surfaces for selectively disengaging and bridging contacts from said fixed contacts.

19. A switch as recited in claim 18 wherein said bridging contacts are disposed for movement in a direction normal to said inner surface of said first member.

20. A switch as recited in claim 18 wherein said bridging contacts are arranged in said second member in a generally rectangular pattern.

21. A switch as recited in claim 18 wherein said first and second members and said actuator are each formed of a plastic material, said first and second members being ultrasonically welded together.

22. A switch as recited in claim 18 wherein said first member is generally U-shaped and adapted to fit partially around a commutator portion of the motor.

23. A switch as recited in claim 22 wherein said first member includes means for retaining conductive brushes in contact with said commutator portion and means for electrically coupling said brushes to said fixed contacts.

* * * * *